July 23, 1968  J. B. RAGSDALE ET AL  3,393,919

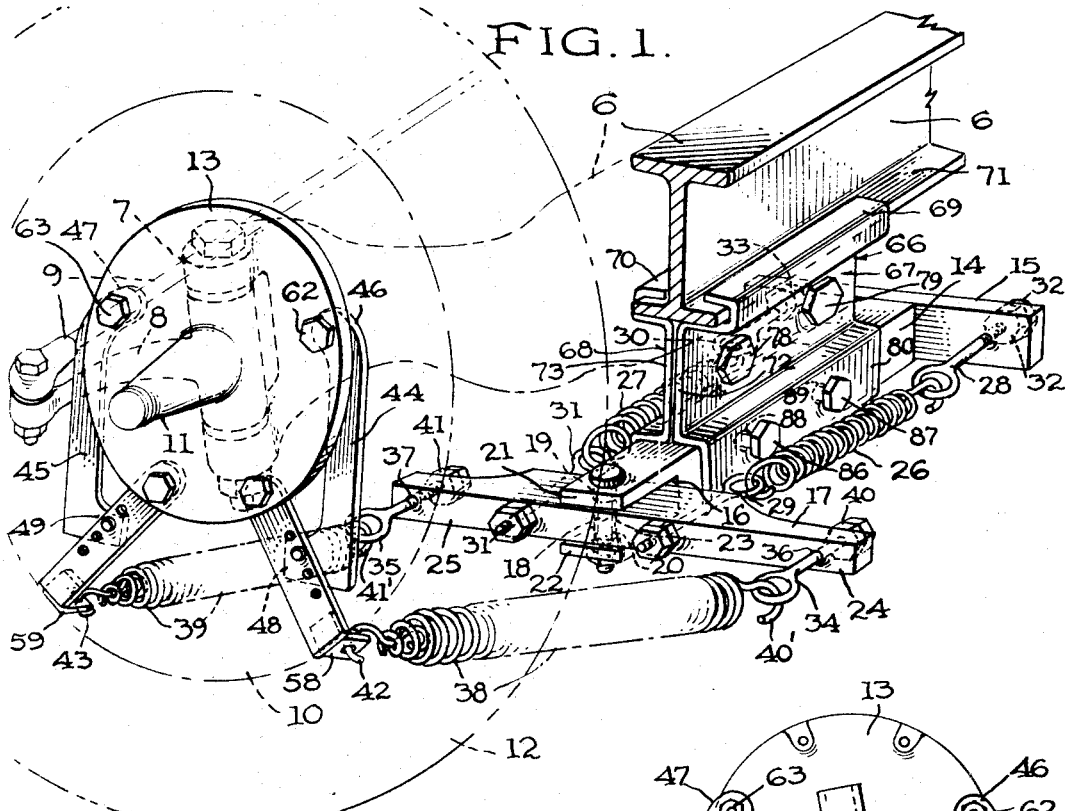
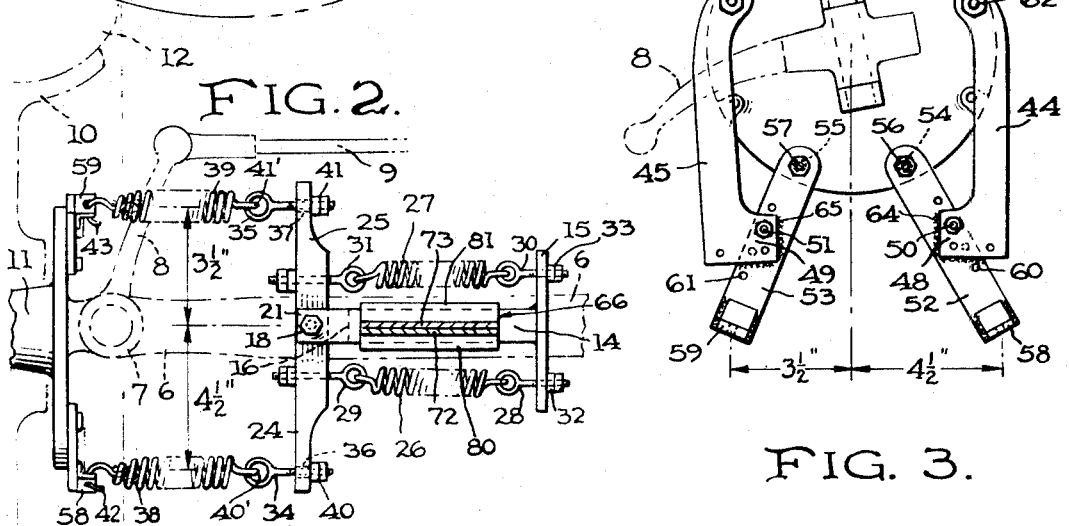

STABILIZER INSTALLATION FOR THE FRONT WHEELS OF A VEHICLE

Filed Nov. 22, 1966  2 Sheets-Sheet 2

INVENTORS

JESSE B. RAGSDALE
ALEXANDER R. CONRAD.

BY Cameron, Kerkam & Sutton

ATTORNEYS

United States Patent Office 3,393,919
Patented July 23, 1968

3,393,919
STABILIZER INSTALLATION FOR THE
FRONT WHEELS OF A VEHICLE
Jesse B. Ragsdale, P.O. A-3, 115 Peachtree Memorial
Drive NW., Atlanta, Ga. 30309, and Alexander R.
Conrad, 316 Peachtree Ave. NE., Atlanta, Ga. 30305
Filed Nov. 22, 1966, Ser. No. 596,297
10 Claims. (Cl. 280—94)

This invention relates to improved stabilizing mechanism for the steerable front wheels of vehicles, particularly trucks, in which the front wheels are not provided with brake drums. It is designed to maintain the wheels in proper parallel alignment with respect to each other in straight driving and to return them to proper alignment if one of them should strike an obstruction or if the steering mechanism should fail.

The invention contemplates the affixation under each of the lateral extremities of the front axle of the vehicle of stabilizing mechanism which is attached to the spindle flange at the center of each of the front wheels of the vehicle by means of improved and novel template structure, which will be fully discussed further on in this specification.

The stabilizer structure per se comprises broadly a center beam in the outer extremity of which is pivotally mounted a turnable arm mounted off-center therein, the forward extremity of the arm being of greater length than its rearward extremity. At the inner or base end of the center beam is rectangularly affixed a cross arm bored at its extremities to receive threaded eye bolts affixed at the inner extremities of comparatively light control springs, the outer extremities of which are attached to eye bolts passed through bores in the turnable arm equally spaced laterally of its pivot point in the center beam, to maintain the turnable arm under equal spring tension from the two control springs extending between the base bar and the turnable arm.

The turnable arm is preferably bored at its extremities for the passage of screw-threaded eye bolts affixed at the inner extremities of two heavy stabilizing springs which extend outwardly therefrom and which are in turn affixed at their outer, hooked extremities in appropriate bored brackets which are carried by template structure adjustably mounted on the inner face of the wheel spindle flange, as will hereinafter be discussed in more detail.

As aforesaid, the stabilizing structures are preferable affixed beneath the lateral extremities of the front axle of the vehicle and operate against the spindle flanges of the front wheels of the vehicle to maintain the wheels in proper alignment at all times and to return them to proper alignment when they are disaligned by striking an obstruction in the road or through failure of the steering mechanism.

A prior patent disclosing somewhat analogous structure, for use with A-frame suspension vehicles, is Worsham, Patent No. 2,993,704 of July 25, 1961. This patent discloses somewhat analogous stabilizing structure, however it does not disclose applicant's novel, readily adjustable stabilizing and template structures, as will hereinafter be discussed in detail.

Referring to the drawings,

FIG. 1 is a fragmentary perspective view, partially in phantom and taken from the right forward extremity of the vehicle, showing the stabilizer affixed beneath the right lateral extremity of the front axle of the vehicle and appropriately connected to the adjustable template structure affixed to the spindle flange of the right front wheel of the vehicle;

FIG. 2 is a bottom plan view of the stabilizer and template structure, partially in phantom and broken away, showing the stabilizer affixed beneath the extremity of the axle of the vehicle and connected to the spindle flange of the wheel thereof through the template structure;

FIG. 3 is a plan view of the template structure in position on the spindle flange of the left wheel, preparatory to the attachment of the large stabilizer springs thereto.

Figure 5:
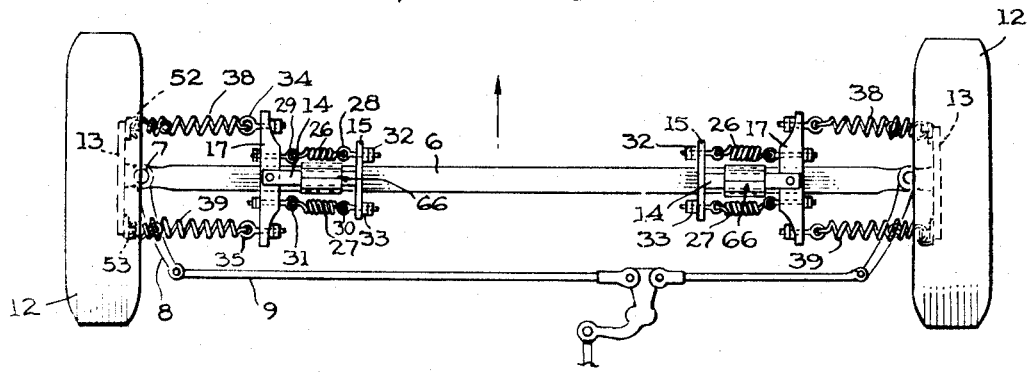
Figure 4:
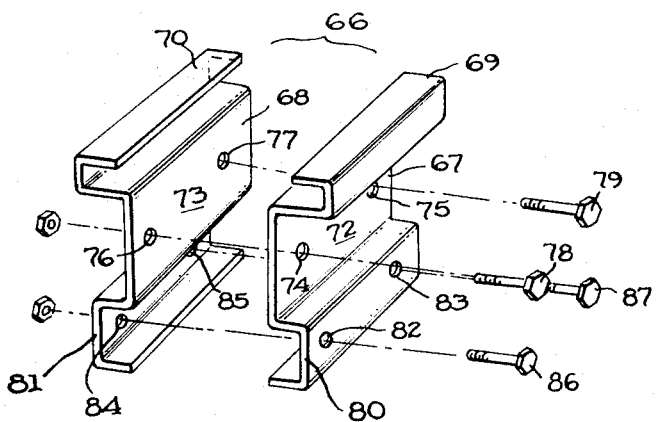

FIG. 4 is an exploded view of a bracket structure designed for the attachment of the stabilizers beneath the lateral extremities of the axle and FIG. 5 is a bottom plan view of the front axle and wheel assembly of a vehicle with the stabilizers attached under each extremity of the axle and connected to templates affixed to the spindle flanges of each of the front wheels thereof, also showing the steering knuckles, steering knuckle arms and steering knuckle tie rod connecting the steering knuckle arms.

In the drawings, FIG. 1, 6 designates the front axle of the vehicle, which is preferably in the form of an I beam in cross section and which is provided on its outer extremities with the usual steering knuckles 7, steering knuckle arms 8 and steering knuckle tie rod 9, connecting the steering knuckle arms of the two front wheels. It will be understood that the stabilizer and template structures and auxiliary structure are identical for each of the front wheels of the vehicle and therefore it will be necessary only to describe the structure as applied to one of the wheels.

As shown, wheel 10 is rotatably mounted on spindle 11 centered on and extending outwardly from spindle flange 13 affixed to steering knuckle 7, pivotally mounted at the extremity of axle 6. Wheel 10 is provided with the usual tire 12, as shown. As aforesaid, spindle flange 13 is positioned at the inner, center periphery of wheel 10 and provides a base for wheel spindle 11.

Referring now to the stabilizer structure per se, as shown in FIGS. 1 and 2, it will be seen that it comprises broadly a preferably rectangular center beam 14 provided at its inner extremity with a cross bar 15 rectangularly disposed with respect thereto and welded or otherwise appropriately affixed at the inner extremity thereof.

At its outer extremity, beam 14 is appropriately slotted at 16 to a considerable depth of approximately one-fifth of its length to provide a pivotal housing for control arm 17, which, as shown, is pivotally mounted off-center in slot 16 by means of a support bolt 18 which is appropriately passed through aligned bores 19 and 20 in upper and lower segments 21 and 22 defining the upper and lower surfaces of slot 16. An appropriate bore 23 is provided through control arm 17 off-center thereof for the passage of bolt 18 whereby the control arm is pivotally mounted in slot 16 of beam 14.

It will be noted that the forward extremity 24 of control arm 17 is preferably longer than its rear section 25, as will be more fully discussed.

Control arm 17 is preferably maintained in normal parallel relation with base bar 15 and spindle flange 13 of the wheel by means of two comparatively light control springs 26 and 27 which are affixed between control arm 17 and base bar 15 by means of eye bolts 28–29 and 30–31, respectively. Eye bolts 28 and 30 are appropriately passed through bores in base bar 15 equally spaced from its center and are maintained therein by nuts and lock nuts 32 and 33 applied over the threaded extremities of eye bolts 28 and 30. It is by means of these nuts 32 and 33 that the tension of control springs 26 and 27, respectively, is adjusted. Outer eye bolts 29 and 31 are appropriately passed through bores in control arm 17 equally spaced on each side of its pivot bore 23 and are adjustably fixed therein by means of nuts and lock nuts applied over their outer extremities, as shown. Integral rings, equally spaced on each side of pivot bore 23 of arm 17, may be substituted for eye bolts 29 and 31, on arm 17, for the reception of the outer, hooked extremities of control springs 26 and 27. Control springs 26 and 27 are of moderate strength and are preferably so tensioned between base bar 15 and main control arm 17 as to maintain control arm 17 under normal conditions parallel to bar 15 and spindle plate 13 of the wheel. They are preferably so tensioned as to maintain control arm 17 in a normal position at right angles to beam 14 of the stabilizer structure. The adjustment of control springs 26 and 27 will be discussed more fully further on in this specification.

Affixed to the outer extremities of control arm 17 by eye bolts 34 and 35 passed through bores 36 and 37 spaced equally from the extremities of arm 17 are heavy stabilizing springs 38 and 39. Eye bolts 34 and 35 are screw-threaded at their inner extremities and are provided with double lock nuts 40 and 41 under arm 17 whereby the tension on springs 38 and 39 between arm 17 and spindle flange 13 may be properly adjusted and set permanently as will be more fully discussed.

Springs 38 and 39 are substantially double the size and strength of control springs 26 and 27, for a purpose hereinafter to be more fully developed. As shown, springs 38 and 39 are provided with hooked inner extremities 40' and 41' which hook into the eyed extremities, respectively, of eye bolts 34 and 35. At their outer extremities, springs 38 and 39 are closed and provided with swivelled hooked extremities 42 and 43 for attachment thereof to the template brackets depending from the spindle flange of the wheel, as will hereinafter be described at more length.

Referring now to the novel template structure adjustably mounted and depending from the surfaces of the spindle flanges 13 of the wheels, this structure is designed to be utilized in cooperation with the stabilizer structure in the following manner.

Referring specifically to the improved template structure for the attachment respectively of swivel hooks 42 and 43 of springs 38 and 39, this structure is so designed as to be readily mounted and adjustable on any type of spindle flange of a front wheel to insure proper positioning of the terminal spring clips disposed at the lower extremities of the lower templates for reception, as aforesaid, of swivel hooks 42 and 43, respectively, of springs 38 and 39.

In view of the fact that the forward section 24 of control arm 17 is preferably one inch longer than its rear section 25 the forward, lower template member should extend forwardly of the median line of spindle flange 13 further than the rearward lower template arm, as will hereinafter be discussed.

The manner of mounting and adjusting the angularity of the respective template members will now be described.

Previously, it has been necessary to form various shapes of individual single templates to fit the various sizes and shapes of spindle flanges of various models of trucks and this entailed the provision of special sizes, shapes and lengths of templates, a specific size, shape and length being necessary for each individual spindle flange. With this new universal template structure, composed of two cooperating template members, the necessity for providing specialized templates for each individual type of spindle flange has been eliminated.

Thus, the universal template structures comprise broadly upper template members 44 and 45, which are preferably provided with inwardly curved, centrally bored upper extremities 46 and 47 and lower, inwardly and rectangularly disposed sections 48 and 49. The inner, upper extremities of lower sections 48 and 49 are appropriately bored for the reception of bolts 50 and 51 to maintain lower template members 52 and 53 in desired angular position with respect to the vertical median line of spindle flange 13.

As shown, lower template members 52 and 53 are preferably elongate and flattened with bores 54 and 55 in their upper extremities to receive bolts 56 and 57 which maintain them in position on the lower periphery of the spindle flange.

At their lower extremities template members 52 and 53 are provided with rectangular bored clips 58 and 59, welded or otherwise affixed thereto, which receive hooks 42 and 43, respectively, of springs 38 and 39. Lower template members 52 and 53 are preferably provided, respectively, with a series of aligned, medially disposed bores 60 and 61 designed to be registered with bores disposed in the feet 48 and 49, respectively, of upper template members 44 and 45, for registration therewith and for affixation thereto by means of appropriate bolts whereby the desired angularity of lower template members 52 and 53 may be realized.

It has been determined that the center of bored clip 58 of forward lower template 52 should preferably be 4½ inches forward of the median line of spindle flange 13 and the center of bored clip 59 of rearward lower template 53 should be 3½ inches to the rear of this median line.

In installing and adjusting the universal template structures the following procedure is followed. First, upper template members 44 and 45 are affixed at their bored upper extremities 46 and 47 over bolts 62 and 63, respectively, provided through the upper peripheral extremities of the spindle flange 13. A 5/16" spacer is preferably provided between the surface of the spindle flange and the inner surface of template members 44 and 45 about bolts 62 and 63 to raise template members 44 and 45 by this amount above the surface of the spindle flange, to accomodate lower template members 52 and 53. Upper templates 44 and 45 may be provided with additional bores beneath their upper extremities for bolting to the spindle flange.

Lower template members 52 and 53 are then applied over bolts 56 and 57, at their bored upper extremities, and bolts 56 and 57 are preliminarily tightened. Then, measuring carefully from the median line of the spindle flange, the bore center clip 58 of lower template 52 is positioned accurately 4½ inches forwardly of the median line of the spindle flange and the bored center of clip 59 of lower template 53 is swung rearwardly and positioned 3½ inches to the rear of said median line. With the lower template members 52 and 53 so positioned, bolts are passed through the registering bores in the feet of upper template members 44 and 45 and in the registering bores 60 and 61 in the centers of lower template members 52 and 53 and are preliminarily tightened down. A further measurement is then made and, if the positioning of the two clips 58 and 59 is accurate, long welds 64 and 65 are then made around the edges of the feet of upper templates 44 and 45 against the surfaces of lower template members 52 and 53, permanently maintaining lower template members 52 and 53 in desired position beneath the spindle flange.

With the lower templates 52 and 53 so permanently affixed and accurately adjusted beneath the spindle flange at proper distances forwardly and rearwardly of the median line thereof, respectively, bored clips 58 and 59 are in proper position to receive hooks 42 and 43 of springs 38 and 39.

The stabilizer structure may, if desired, be welded or otherwise affixed beneath axle 6, but accurate welding is difficult and leaves much to be desired. Therefore, bracket 66 has been devised to permit ready and proper installation of the two stabilizer units beneath the lateral extremities of the axle.

Bracket 66 is preferably composed of two mating halves 67 and 68, the upper extremities of which are rectangularly formed or flanged at 69 and 70 to closely fit over and receive the lower flange 71 of axle 6. The center sections thereof, 72 and 73, are designed to closely engage beneath axle flange 71, as shown in FIG. 1, and are provided with mating bolt holes 74–76 and 75–77 receiving bolts 78 and 79 to maintain the bracket structure rigidly in proper position beneath axle 6.

At their lower extremities bracket members 67 and 68 are provided with enlarged, rectangular recessed sections 80 and 81 appropriately bored at 82–83 and 84–85 to receive retaining bolts 86 and 87 which are appropriately passed through bores 88 and 89 in beam 14 of the stabilizer, registering respectively with bores 82–84 and 83–85 in lower bracket recesses 80 and 81.

Thus, it will be seen that in utilizing the brackets 66 to affix the stabilizers beneath the extremities of axle 6 the bracket members are first partially applied over main bar 14 of the stabilizer at their rectangular recessed lower extremities 80 and 81 and upper flanges 69 and 70 are then applied over the lower flange 71 of axle 6, bolts 78–79 and 86–87 being passed through the appropriate bores, nuts then being applied thereover and tightened down to maintain the stabilizer structures in proper position beneath axle 6 with their axes parallel to the axis of axle 6 in the same vertical plane therewith.

With the stabilizers thus securely bracketed under the extremities of axle 6, swivel hooks 42 and 43 of springs 38 and 39 are then passed through the bores of template clips 58 and 59 and lock nuts 40 and 41 are turned down to extend and equally tension springs 38 and 39. In making the final adjustment the nuts 32 and 33 over the threaded extremities of eye bolts 28 and 30 are turned down until control springs 26 and 27 are under uniform and equal tension, maintaining control arm 17 in true rectangular position with respect to bar 14 of the stabilizer structure on pivot bolt 18 and parallel to spindle flange 13 of the wheel. Nuts 40 and 41 at the extremities of eye bolts 34 and 35 are then turned down until springs 38 and 39 are at maximum tension between the templates and the control arm, and are locked in this position.

Sufficient tension should preferably be placed on springs 26 and 27 in this adjustment so that they open at least 1/16 of an inch. This opening may be increased if faster steering wheel recovery is desired.

Referring specifically to the control arm 17, the forward section 24 of which is preferably 1 inch longer than the rearward section 25 thereof, the reason for this difference in length between the two arms lies in the fact that if the wheel strikes an obstruction in the road the forward edge of the wheel will impinge first and this length differential in the arms increases the "pull" of the shorter rear sections 25 of arm 17 whereby recovery from the impact on the wheel will be rapid. In addition to this rapid recovery feature the provision of the shorter section 25 on the rear extremity of arm 17 insures clearance thereof with the steering knuckle arm.

To install the stabilizers, with the templates properly positioned on the spindle flanges of the wheels, as aforesaid, with the clips of the forward template members 52 preferably positioned 4½ inches forwardly of the median line of the spindle flange and the clips 59 of the rear templates 53 positioned 3½ inches behind the median line of the spindle flange, the hooks 42 and 43 at the ends of springs 38 and 39 are inserted into clips 58 and 59, respectively, at the lower extremities of templates 52 and 53. The stabilizer unit is then affixed under each extremity of the axle by means of the brackets 66 and pulled inwardly until springs 38 and 39 are pulled tight, with no sag, and control bar 17 is parallel to the spindle flange. The bracket bolts are then tightened and locked down, holding springs 38 and 39 in extended and tight condition. Nuts 40 and 41 on eye bolts 34 and 35 are then turned down fully to put maximum tension on springs 38 and 39 and are then locked down permanently by their lock nuts.

The nuts 32 and 33 at the extremities of eye bolts 28 and 29 of control springs 26 and 27 are then turned down equally, placing control springs 26 and 27 under equal tension, as aforesaid, preferably extended 1/16 inch, and the lock nuts are then applied over the threaded ends of bolts 28 and 30. The steering of the vehicle, in motion, should then be checked and if the recovery is too rapid the tension on control springs 26 and 27 should be relieved equally by turning off each of the nuts 32 and 33 thereof on eye bolts 28 and 30 an equal amount until wheel recovery is as desired. If recovery is too slow, the nuts 32 and 33 of eye bolts 28 and 30 should be turned down the same amount until recovery is as desired.

If the vehicle tends to lead to the right the appropriate control springs 26 and 27 of each stabilizer unit must be adjusted to eliminate this "pull" to the right. Thus, control spring 26 of the left hand stabilizer and control spring 27 of the right hand stabilizer should be loosened and control spring 27 of the left hand stabilizer and control spring 26 of the right hand stabilizer should be tightened an equal amount. This adjustment is done by loosening nut 32 of the left hand stabilizer and nut 33 of the right hand stabilizer and by tightening an equal amount nut 33 of the left hand stabilizer and nut 32 of the right hand stabilizer until the leading is eliminated.

The reverse of this operation is followed if the wheels should lead to the left. Thus, if the lead is to the left, spring 27 of the left hand stabilizer and spring 26 of the right hand stabilizer should be loosened, equally, and spring 26 of the left hand stabilizer and spring 27 of the right hand stabilizer should be tightened, all an equal amount, by turning respective nuts 32 and 33, as required, an equal number of turns. The amount of loosening or tightening on the respective eye bolts of springs 26 and 27 depends upon the amount of leading, but they should always be adjusted equally.

No adjustment is necessary on large springs 38 and 39 which have already been extended when the stabilizers were applied on the axle, as aforesaid. Springs 38 and 39 act to maintain the front wheels in proper alignment. Control springs 26 and 27 control the steering and the recovery of the wheels and are therefore the only springs requiring fine adjustment.

As aforesaid, such adjustment is done by "criss-cross" and equalized loosening or tightening of control springs 26 and 27 through their respective eye bolts and nuts.

Due to the fact that the front wheels are interconnected between the steering knuckle arms by the steering knuckle tie rod or rods, movement of one wheel outwardly or inwardly will be translated to the opposite wheel and thus to the stabilizer structure of the opposite wheel, whereby highly compensating and compound stabilizing action is obtained on both wheels from both stabilizer units. Thus, recovery from disalignment of either wheel is greatly accelerated and each stabilizing unit acts not only on its specific wheel, but on the opposite wheel as well. A compound action therefore results, thus insuring the stabilization of both wheels when either strikes an obstruction and insuring quick return to proper alignment of both wheels in an emergency.

As aforesaid, increase of tension on springs 26 and 27 results in a "faster" steering action and decrease of tension thereon has the opposite effect.

The invention is susceptible of numerous modifications without departing from the spirit thereof. Mechanical equivalents of all elements of the combination may be substituted therefor within the spirit of the invention.

Attention is directed to the appended claims for a limitation of the scope of this invention.

What is claimed is:

1. In stabilizer structure for the front wheels of a vehicle designed to be affixed beneath each extremity of the axle thereof and attached to the inner surfaces of the wheel spindle flanges, a center beam, a cross bar rectangularly affixed across the inner end of said beam, a control arm pivotally mounted in the outer extremity of said center beam, low tension control springs affixed between the extremities of said cross bar and the median section of said control arm, two pair of angularly disposed upper and lower template members, one pair each attached to opposite sides of the inner surfaces of the wheel spindle flanges extending downwardly therefrom, said upper template member adjustably attached to said lower template member, bored clips at the lower extremities of the lower of said templates, heavy, equally tensioned springs affixed between said bored clips and the outer extremities of said control arm whereby the wheels of the vehicle will be maintained in proper alignment or returned thereto when a wheel strikes an obstruction.

2. A stabilizer in accordance with claim 1 in which the control springs are attached to said control arm at equal distances to each side of its pivot point.

3. A stabilizer in accordance with claim 1 in which the control springs are adjustably affixed between the extremities of the cross bar and the control arm.

4. A stabilizer structure in accordance with claim 1 wherein the extremities of said control arm are of different lengths and the forwardly disposed arm is the longer.

5. A stabilizer in accordance with claim 1 wherein the forward extremity of said control arm is at least 1 inch longer than the rear extremity thereof.

6. A stabilizer in accordance with claim 1 wherein the springs between the cross bar and the control arm are of less than ½ the strength of the springs between the control arm and the wheel hub.

7. A stabilizer in accordance with claim 1 wherein the forward of the two lower templates extends beyond the median line of the hub at least an inch further than the rear lower template extends behind it.

8. A stabilizer in accordance with claim 1 in which said stabilizers are affixed beneath the extremities of the axle in mating clamps.

9. A stabilizer in accordance with claim 1 in which the heavy springs are pulled tight after connection between the control arm and the templates and in which they are attached to the control arm at equal distances on each side of its fulcrum.

10. A stabilizer in accordance with claim 1 in which said upper and lower template members are angularly adjustable with respect to each other to control the relative positions of the bored clips at the lower extremities of said lower template members.

References Cited

UNITED STATES PATENTS

| | | | |
|---|---|---|---|
| 2,993,704 | 7/1961 | Worsham | 280—96.2 |
| 3,257,123 | 6/1966 | Giovinazzo | 280—96.2 |

BENJAMIN HERSH, *Primary Examiner.*

L. D. MORRIS, *Assistant Examiner.*